US008626890B2

(12) United States Patent
Colrain et al.

(10) Patent No.: US 8,626,890 B2
(45) Date of Patent: Jan. 7, 2014

(54) CONNECTION POOL USE OF RUNTIME LOAD BALANCING SERVICE PERFORMANCE ADVISORIES

(75) Inventors: Carol L. Colrain, Redwood Shores, CA (US); Rajkumar A. Irudayaraj, Mountian View, CA (US); Douglas N. Surber, Orinda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 162 days.

(21) Appl. No.: 12/938,545

(22) Filed: Nov. 3, 2010

(65) Prior Publication Data

US 2011/0055368 A1  Mar. 3, 2011

Related U.S. Application Data (60) Division of application No. 11/168,968, filed on Jun. 27, 2005, which is a continuation-in-part of application No. 10/917,715, filed on Aug. 12, 2004, now Pat. No. 7,664,847.

(60) Provisional application No. 60/652,368, filed on Feb. 11, 2005, provisional application No. 60/495,368, filed on Aug. 14, 2003.

(51) Int. Cl.
*G06F 15/173* (2006.01)

(52) U.S. Cl.
USPC ............ 709/223; 709/226; 709/201; 709/220

(58) Field of Classification Search
USPC .......................... 709/223, 220, 226, 201, 227
See application file for complete search history.

(56) References Cited

U.S. PATENT DOCUMENTS

| 5,951,694 | A | 9/1999 | Choquier et al. |
| 6,035,379 | A | 3/2000 | Raju et al. |
| 6,041,357 | A | 3/2000 | Kunzelman et al. |
| 6,088,728 | A | 7/2000 | Bellemore et al. |
| 6,105,067 | A | 8/2000 | Batra |
| 6,353,898 | B1 | 3/2002 | Wipfel et al. |

(Continued)

FOREIGN PATENT DOCUMENTS

| EP | 0942363 A2 | 9/1999 |
| WO | WO 02/07037 A1 | 1/2002 |
| WO | WO 03/014928 A2 | 2/2003 |
| WO | WO 03/062983 A2 | 7/2003 |

OTHER PUBLICATIONS

Amza, C. et al., "Bottleneck Characterization of Dynamic Web Site Benchmarks" *In Third IBM CAS Conference* (2002) 15 pages.

(Continued)

*Primary Examiner* — Tammy Nguyen
(74) *Attorney, Agent, or Firm* — Hickman Palermo Truong Becker Bingham Wong LLP (57) ABSTRACT

Runtime connection load balancing of work across connections to a clustered computing system involves the routing of requests for a service, based on the current operational performance of each of the instances that offer the service. A connection is selected from an identified connection pool, to connect to an instance that provides the service for routing a work request. The operational performance of the instances may be represented by performance information that characterizes the response time and/or the throughput of the service that is provided by a particular instance on a respective node of the system, and is relative to other instances that offer the same service.

4 Claims, 3 Drawing Sheets (56) References Cited

U.S. PATENT DOCUMENTS

| | | | |
|---|---|---|---|
| 6,389,431 B1 | 5/2002 | Frolund et al. | |
| 6,438,705 B1 | 8/2002 | Chao et al. | |
| 6,556,659 B1 | 4/2003 | Bowman-Amuah | |
| 6,615,265 B1 | 9/2003 | Leymann et al. | |
| 6,748,414 B1 | 6/2004 | Bournas | |
| 6,912,588 B1 | 6/2005 | Jardin et al. | |
| 7,032,025 B2* | 4/2006 | Boys | 709/227 |
| 7,058,717 B2* | 6/2006 | Chao et al. | 709/226 |
| 7,174,379 B2 | 2/2007 | Agarwal et al. | |
| 7,272,653 B2 | 9/2007 | Levy-Abegnoli et al. | |
| 2001/0027491 A1 | 10/2001 | Terretta et al. | |
| 2001/0056493 A1 | 12/2001 | Mineo | |
| 2002/0055982 A1 | 5/2002 | Goddard | |
| 2002/0073019 A1 | 6/2002 | Deaton | |
| 2002/0099598 A1 | 7/2002 | Eicher et al. | |
| 2002/0116457 A1 | 8/2002 | Eshleman et al. | |
| 2002/0129157 A1 | 9/2002 | Varsano | |
| 2002/0161896 A1 | 10/2002 | Wen et al. | |
| 2002/0198985 A1 | 12/2002 | Fraenkel et al. | |
| 2003/0005028 A1 | 1/2003 | Dritschler et al. | |
| 2003/0014523 A1 | 1/2003 | Teloh et al. | |
| 2003/0204509 A1 | 10/2003 | Dinker et al. | |
| 2003/0208523 A1* | 11/2003 | Gopalan et al. | 709/201 |
| 2004/0019680 A1 | 1/2004 | Chao et al. | |
| 2004/0024979 A1 | 2/2004 | Kaminsky et al. | |
| 2004/0088413 A1 | 5/2004 | Bhogi et al. | |
| 2004/0098490 A1 | 5/2004 | Dinker et al. | |
| 2004/0176996 A1 | 9/2004 | Powers et al. | |
| 2004/0221031 A1 | 11/2004 | Desai | |
| 2005/0165925 A1 | 7/2005 | Dan et al. | |
| 2008/0228923 A1 | 9/2008 | Chidambaran et al. | |

OTHER PUBLICATIONS

The Apache Software Foundation retrieved on Oct. 14, 2005 from the Internet < URL: http:www.apache.org > 2 pages.

Aversa, L. et al., "Load Balancing a Cluster of Web Servers" *Technical Report* (1999) 13 pages.

Bestavros, A. et al., "Distributed Packet Rewriting" *In Proceedings of the International Conference on Network Protocols* (1998) 8 pages.

Cardellini, V. et al., "The State of the Art in Locally Distributed Web-server Systems" *ACM Computing Surveys* (2001) 55 pages.

Cecchet, E. et al., "A Comparison of Software Architectures for E-business Applications" *Technical Report* (2002) 15 pages.

"Cisco LocalDirector 400 Series" retrieved on Oct. 14, 2005 from the Internet< URL: http://www.cisco.com/warp/public/cc/pd/cxsr/400/index.shtml > 2 pages.

Coutinho, B. et al., "Assessing the impact of distribution on e-business services" *In First Seminar on Advanced Research in Electronic Business* (2002) 8 pages.

Gadde, S. et al., "Web Caching and Content Distribution: A View From the Interior" *Computer Communications* (2001) 12 pages.

Harkins, P. "Building a Large-Scale E-commerce site with Apache and mod_perl" *In Proceedings of ApacheCom* (2001) 15 page document.

Hunt, G. et al., "Network Dispatcher: a connection router for scalable Internet services" *Computer Networks and ISDN Systems* (1998) 14 pages.

McDavid, D. "A standard for business architecture description" *IBM Systems Journal* (1999) 19 pages.

Meira, W. et al., "E-representative: a scalability scheme for e-commerce" *In Proceedings of the Second International Workshop on Advanced Issues of E-Commercce and Web-based Information Systems* (2000) 8 pages.

Mosberger, D. et al, "httperf—A Tool for Measuring Web Server Performance" *In First Workshop on Internet Service Performance* (1998) 9 pages.

Nahum, E. et al., "Performance Issues in WWW Servers" *IEEE* (2002) 11 pages.

Oracle® Database "Concepts" Part No. B10743-01 (2003) 732 pages.

Oracle® Database "JDBC Developer's Guide and Reference" Part No. B10979-02 (2004) 432 pages.

Oracle® Database "High Availability Architecture and Best Practices" Part No. B10726-02 (2004) 222 pages.

Oracle® Database "Net Services Administrator's Guide" Part No. B10775-01 (2004) 434 pages.

Oracle® Database "Net Services Reference Guide" Part No. B10776-01 (2004) 274 pages.

Oracle® Real Application Clusters "Deployment and Performance Guide" Part No. B10768-02 (2004) 58 pages.

Oracle® Real Application Clusters "Installation and Configuration Guide" Part No. B10766-08 (2004) 468 pages.

Henry Song, et al., "Browser State Repository Service," Lecture Notes in Computer Science, vol. 2414, 2002, pp. 1-14, XP002904339.

Pierre, G. et al., "Differentiated Strategies for Replicating Web Documents" In Proceedings of the 5$^{th}$ *International Web Caching and Content Delivery Workshop* (2000) 16 pages.

Sontag, E. et al., "A Notion of Input to Output Stability" (1997) 6 pages.

Teodoro, G. et al., "Load Balancing on Stateful Clustered Web Servers" *IEEE* (2003) 9 pages.

Wrigley, C. "Design Criteria for Electronic Market Servers" *Electronic Markets* (1997) pp. 12-16.

Chase, Jeffrey S., "Dynamic Virtual Clusters in a Grid Site Manager," Proceedings of the IEEE International Symposium on HPDC-2003, XP010463715, pp. 90-100.

U.S. Appl. No. 10/917,663, filed Aug. 12, 2004, Notice of Allowance, mailed Jan. 31, 2011.

* cited by examiner

CONNECTION POOL USE OF RUNTIME LOAD BALANCING SERVICE PERFORMANCE ADVISORIES

CROSS REFERENCE TO RELATED APPLICATIONS

This application is a divisional application of U.S. patent application Ser. No. 11/168,968 filed on Jun. 27, 2005, entitled "Connection Pool Use of Runtime Load Balancing Service Performance Advisories" which: (1) is related to and claims the benefit of priority to U.S. Provisional Patent Application No. 60/652,368 filed on Feb. 11, 2005, entitled "Runtime Load Balancing Based on Service Level Performance"; and (2) is a continuation-in-part of and claims the benefit of priority to U.S. patent application Ser. No. 10/917,715 filed on Aug. 12, 2004 now U.S. Pat. No. 7,664,847, entitled "Managing Workload By Service", which claims the benefit of priority to U.S. Provisional Patent Application No. 60/500,096 filed on Sep. 3, 2003, entitled "Service Based Workload Management and Measurement In a Distributed System" and which claims the benefit of priority to U.S. Provisional Patent Application No. 60/495,368 filed on Aug. 14, 2003, entitled "Computer Resource Provisioning." The present application incorporates by reference and claims the benefit of priority to all previously filed applications mentioned in this paragraph.

This application is related to the following applications, the contents of all of which are incorporated by this reference in their entirety for all purposes as if fully set forth herein:

U.S. patent application Ser. No. 10/917,663 filed on Aug. 12, 2004, entitled "Fast Reorganization Of Connections In Response To An Event In A Clustered Computing System";

U.S. application Ser. No. 10/917,661 filed on Aug. 12, 2004, entitled "Calculation of Service Performance Grades in a Multi-Node Environment That Hosts the Services";

U.S. patent application Ser. No. 11/168,967 filed on Jun. 27, 2005, entitled "Runtime Load Balancing Of Work Across A Clustered Computing System Using Current Service Performance Levels".

FIELD OF THE INVENTION

The present invention relates generally to distributed computing systems and, more specifically, to techniques for connection pool use of runtime load balancing service performance advisories.

BACKGROUND OF THE INVENTION

Many enterprise data processing systems rely on distributed database servers to store and manage data. Such enterprise data processing systems typically follow a multi-tier model that has a distributed database server in the first tier, one or more computers in the middle tier linked to the database server via a network, and one or more clients in the outer tier.

Clustered Computing System

A clustered computing system is a collection of interconnected computing elements that provide processing to a set of client applications. Each of the computing elements is referred to as a node. A node may be a computer interconnected to other computers, or a server blade interconnected to other server blades in a grid. A group of nodes in a clustered computing system that have shared access to storage (e.g., have shared disk access to a set of disk drives or non-volatile storage) and that are connected via interconnects is referred to herein as a work cluster.

A clustered computing system is used to host clustered servers. A server is combination of integrated software components and an allocation of computational resources, such as memory, a node, and processes on the node for executing the integrated software components on a processor, where the combination of the software and computational resources are dedicated to providing a particular type of function on behalf of clients of the server. An example of a server is a database server. Among other functions of database management, a database server governs and facilitates access to a particular database, processing requests by clients to access the database.

Resources from multiple nodes in a clustered computing system can be allocated to running a server's software. Each allocation of the resources of a particular node for the server is referred to herein as a "server instance" or instance. A database server can be clustered, where the server instances may be collectively referred to as a cluster. Each instance of a database server facilitates access to the same database, in which the integrity of the data is managed by a global lock manager.

Services for Managing Applications According to Service Levels

Services are a feature for database workload management that divide the universe of work executing in the database, to manage work according to service levels. Resources are allocated to a service according to service levels and priority. Services are measured and managed to efficiently deliver the resource capacity on demand. High availability service levels use the reliability of redundant parts of the cluster.

Services are a logical abstraction for managing workloads. Services can be used to divide work executing in a database cluster into mutually disjoint classes. Each service can represent a logical business function, e.g., a workload, with common attributes, service level thresholds, and priorities. The grouping of services is based on attributes of the work that might include the application function to be invoked, the priority of execution for the application function, the job class to be managed, or the data range used in the application function of a job class. For example, an electronic-business suite may define a service for each responsibility, such as general ledger, accounts receivable, order entry, and so on. Services provide a single system image to manage competing applications, and the services allow each workload to be managed in isolation and as a unit. A service can span multiple server instances in a cluster or multiple clusters in a grid, and a single server instance can support multiple services.

Middle tier and client/server applications can use a service by, for example, by specifying the service as part of the connection. For example, application server data sources can be set to route to a service. In addition, server-side work sets the service name as part of the workload definition. For example, the service that a job class uses is defined when the job class is created, and during execution, jobs are assigned to job classes and job classes run within services.

Database Sessions

In order for a client to interact with a database server on a database cluster, a session is established for the client. Each session belongs to one service. A session, such as a database session, is a particular connection established for a client to a server, such as a database instance, through which the client issues a series of requests (e.g., requests for execution of database statements). For each database session established on a database instance, session state data is maintained that reflects the current state of a database session. Such information contains, for example, the identity of the client for which the session is established, the service used by the client, and temporary variable values generated by processes executing software within the database session. Each session may each have its own database process or may share database processes, with the latter referred to as multiplexing.

Connections are mechanisms for enabling sessions. A connection may refer to either a physical mechanism or a logical connection mechanism, or both. Often, there is a one-to-one mapping of logical connections to physical connections; however, it is possible to have more than one logical connection associated with single physical connection or more than one physical connection associated with a single logical connection. Regardless, management of connections to a clustered database that comprises multiple server instances executing on multiple machines is amplified as the number of instances, machines and clusters increases. An important and challenging feature that is expected from a clustered database is management of many connections to the clustered database server.

Generally, a connection is a vehicle to perform work with a database. A business transaction may comprise one or more work requests. When using a connection pool, an application "borrows" a connection from a connection pool, executes the work requests, and then returns the connection back into the connection pool.

BRIEF DESCRIPTION OF THE DRAWINGS

Embodiments of the present invention are depicted by way of example, and not by way of limitation, in the figures of the accompanying drawings and in which like reference numerals refer to similar elements and in which.

DETAILED DESCRIPTION OF EMBODIMENTS OF THE INVENTION

Techniques for connection pool use of runtime load balancing service performance advisories are described. As described in U.S. patent application Ser. No. 11/168,967 filed on Jun. 27, 2005, entitled "Runtime Load Balancing Of Work Across A Clustered Computing System Using Current Service Performance Levels", current service level performance information and work distribution advisories are computed and made available to client subscribers, with which work routing decisions can be made. Service level performance information and work distribution advisories regarding the different instances of the system can be used to allow balancing of the work across the system.

Functional Overview of Embodiments

Runtime load balancing of work across a clustered computing system involves servers calculating, and clients utilizing, the current service performance levels of each instance in the system. Such performance levels ("performance grades") are based on performance metrics, and corresponding percentage distribution advisories are posted for use by various types of client subscribers.

Within a multi-instance server, various performance metrics are gathered for each instance. These performance metrics may include operations completed per second, elapsed time per operation, CPU utilization, I/O utilization, network utilization, and the like. A moving average of the metrics is usually used in order to smooth out any short-term variations. In one embodiment, each instance within the server periodically sends its performance metrics to a centralized location.

The server then computes a performance grade for each instance. The computation used may vary by policy. Examples of possible policies include: (a) using estimated bandwidth as a performance grade, (b) using spare capacity as a performance grade, or (c) using response time as a performance grade. The server may compute a performance grade for each instance without regard to the performance of other instances, or the server may holistically look at all instances to produce a grade for each instance. The server publishes the performance grades of the instances to the client subscribers.

Using the techniques described herein, clients distribute work requests across servers in a clustered computing environment as the requests arrive. Automatically and intelligently directing work requests to the best server instances, based on real-time service performance metrics, minimizes the need to manually relocate work within the clustered system. In general, basing work request routing decisions on service response time and/or service throughput recognizes, for non-limiting examples, differences in various machine's current workload and computing power, sessions that are blocked in wait mode, failures that block processing, and competing services having different levels of priority.

Techniques for runtime connection load balancing across a clustered computing system using service performance advisories are described. Such techniques are used to route requests for performance of work, based on performance metrics associated with various server instances that offer services that perform the work. Work requests are routed to connections that best serve the work, and such routing techniques respond quickly to changing conditions in the system.

In one aspect, a request for a connection to a clustered computing system for performance of some work is received, such as by a connection pool manager. A pool of connections to the system is identified, where the pool is associated with a service that performs the work for which the connection is requested. Instances that offer the service that performs the requested work are identified. Based on operational performance metrics associated with the service provided on the various identified instances, a connection is selected from the identified pool, to connect to an instance that provides the service for routing a request for performance of the work.

Operating Environment

Figure 1:
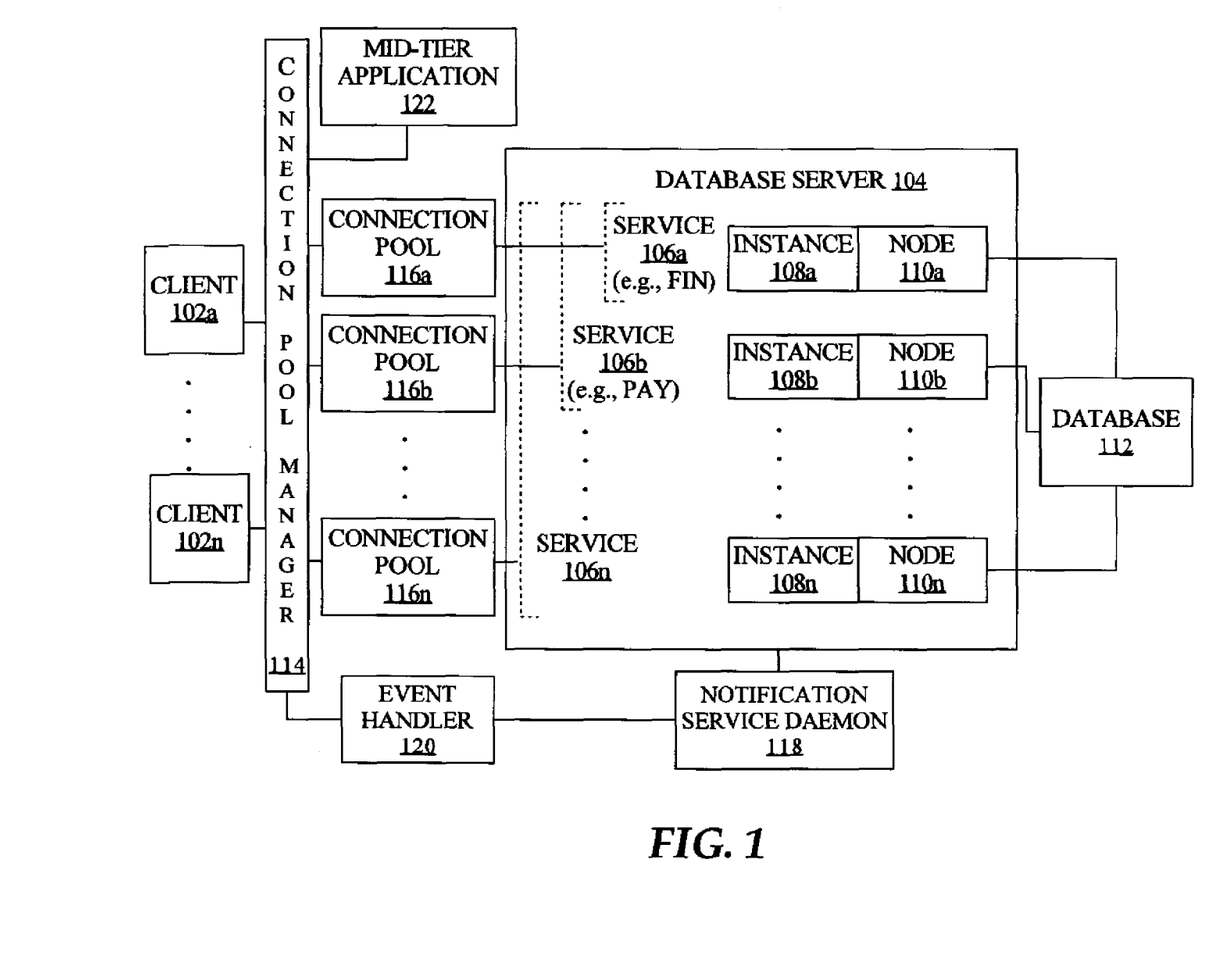
FIG. 1 is a block diagram that illustrates an operating environment in which an embodiment can be implemented.

FIG. 1 is a block diagram that illustrates an operating environment in which an embodiment can be implemented. Embodiments of the invention may be implemented using a connection pool manager that is associated with a clustered computing system, such as a clustered database server comprising multiple database server instances executing on multiple host nodes to access and manipulate shared data stored on a data storage mechanism. The example operating environment of FIG. 1 is illustrated and described in the context of a clustered database server for purposes of discussion, however, it is contemplated that any distributed database server or distributed computing system could benefit from use of the broader techniques enabled herein. Therefore, embodiments of the invention are not limited to use with a clustered database system.

One or more clients 102a-102n are communicatively coupled to a distributed, or clustered, database server ("database server") 104. Database server 104 refers to database server instances 108a-108n and nodes 110a-110n on which the instances execute. Other components may also be considered as part of the database server 104, such as a connection pool manager 114, connection pools 116a-116n, a notification service daemon 118 and an event handler 120. The actual architecture in which the foregoing components are configured may vary from implementation to implementation.

In FIG. 1, connection pool manager 114 and connection pools 116a-116n are depicted as components not within database server 104 for purposes of example. Connection pool manager 114 is communicatively coupled to and utilized by an application server or, generally, a middle tier application 122. In addition, connection pool manager 114 is logically coupled to connection pools 116a-116n, which are logically coupled to database server 104. Notification service daemon 118 and event handler 120 are also depicted as not within database server 104, and are communicatively coupled to database server 104, in particular embodiments.

Clients 102a-102n are applications that execute processes on the database server 104 via, for example, a network. One server instance may be a client of another server instance.

Database 112 comprises data and metadata that is stored on a persistent memory mechanism, such as a set of hard disks that are communicatively coupled to nodes 110a-110n, each of which is able to host one or more instances 108a-108n, each of which hosts at least a portion of one or more services. Such data and metadata may be stored in database 112 logically, for example, according to object-oriented constructs, object-relational constructs, relational constructs, multidimensional constructs, or a combination of relational and multidimensional database constructs. Nodes 110a-110n can be implemented as a conventional computer system, such as computer system 300 illustrated in FIG. 3.

As described, a database server, such as each of instances 108a-108n, is a combination of integrated software components and an allocation of computational resources (such as memory and processes) for executing the integrated software components on a processor, where the combination of the software and computational resources are used to manage a particular database, such as database 112. Among other functions of database management, a database server typically governs and facilitates access to database 112 by processing requests from clients to access the database 112. Therefore, connection pool manager 114, which manages connections to database server 104, can be implemented as a processing layer between clients 102a-102n and instances 108a-108n, which manage access to database 112. Instances 108a-108n, in conjunction with respective nodes 110a-110n, host services, described hereafter.

Services 106

As described, services are a logical abstraction for managing workloads. A service, such as service 106a-106n, is the performance of work of a particular type or category, where the work performed is for the benefit of one or more clients of one or more servers, and where a level or quality of performance is prescribed for the particular type or category of work. The work performed as part of a service includes any use or expenditure of computer resources, including, for example, CPU processing time, storing and accessing data in volatile memory and read and writes from and/or to persistent storage (i.e., IO processing), and use of network or bus bandwidth.

In general, a service is work that is performed by a database server and typically includes the work performed to process and/or compute queries that require access to a particular database. The term query as used herein refers to a statement that conforms to a database language, such as SQL, and includes statements that specify operations to add, delete, or modify data and create and modify database objects, such as tables, objects views, and executable routines.

A single database may support many services. For a non-limiting example, services may be divided into a FIN service and a PAY service, where the FIN and PAY services share the clustered database. The FIN service is the database service performed by server 104 for a FIN application. Typically, the FIN service involves accessing database objects on database 112 that store data for FIN applications. The PAY service is the service performed by server 104 for PAY applications. Typically, the PAY service involves accessing database objects on database 112 that store data for PAY applications.

Database instances of a database cluster are allocated to support one or more services. When a database instance (or node) is allocated to perform a service, the database instance is referred to herein as hosting, running, or providing the service, and the service is referred to herein as running or being placed on the database instance.

Services can be provided by one or more database server instances. The service on each instance is referred to as a master of that service. Thus, multiple server instances may work together to provide a service to a client. In FIG. 1, service 106a (e.g., FIN) is depicted, with dashed brackets, as being provided by instance 108a, service 106b (e.g., PAY) is depicted as being provided by instances 108a and 108b, and service 106n is depicted as being provided by instances 108a-108n.

Connection Pool Manager 114 and Connection Pools 116

A connection pool is a named group of identical connections to the database that are created when the connection pool is registered. Applications that interact with the database borrow connections from the pool, use the connections to execute work requests, and then return the connections to the pool. Connection pools operate by creating connections infrequently and keeping the connections in the connection pool for long duration. Work requests come into the connection pool with high frequency, borrow these connections, and exist for relatively short duration.

As described herein, work requests can be distributed across the instances of a cluster offering a service, using (1) the service performance, e.g., as represented by response time and/or throughput; (2) available resource capacity, e.g., resource profile; and (3) service resource needs, e.g., service demand. In one embodiment, balancing of work requests occurs at two different times—at connect time and at runtime. These are referred to as Connection Load Balancing and Runtime Connection Load Balancing.

The connection pool manager 114 is a software component, which manages connection pools 116a-116n and requests for connections for sessions with server 104, including the routing of connection requests to the appropriate connection pool 116a-116n, based on the pool setup and configuration. Each connection pool 116a-116n is a set of connections to database sessions. Each session, for which communications between a client 102a-102n and an instance 108a-108n are transmitted through one of the connections from a respective connection pool 116a-116n, is considered a session with an instance 108a-108n.

Each connection can be instantiated as a connection object and for each connection object, the following information is recorded when a database session connection is established: (1) the service that the session is using; (2) the name of the node on which the associated service is available and to which this connection belongs; (3) the unique name of the database in use; and (4) the name of the instance to which this connection's database session belongs. Thus, the location (at times referred to as the "signature") of each session is uniquely identified. The manner in which the signature is recorded may vary from implementation to implementation. For non-limiting examples, a signature may be recorded to a bulletin board mechanism that is accessible to various subscribers, or the signature may be stored in an indexed table or a hash table. The signature is also returned to the connection in various ways. In one embodiment, a handle is used as part of a connection conversation. Detailed actions that various subscribers may perform in response to notification events are beyond the scope of this description.

Generally, connection pool manager 114 is responsible for creation, maintenance and removal of connections and connection pools 116a-116n. For example, connection pool manager 114 may be used to manage connection pools 116a-116n through use of a set of APIs. In addition, connection pool manager 114 binds a connection pool 116a-116n to its corresponding data source object. In this context, a data source object is an abstraction of an interface to the database 112. Hence, binding a connection pool to a data source object may include mapping the connection pool to the data source object via a URL that identifies the associated service and the port through which the database 112 is accessed for the service.

A particular service, such as any of services 106a-106n, may be provided by one or more instances 108a-108n. A particular service is associated with a particular connection pool 116a-116n that consists of multiple connections to the one or more instances. For example, service 106a may be provided through connections from connection pool 106a; service 106b may be provided by connections from connection pool 106b; and service 106n may be provided by connections from connection pool 106n. Such an association, or mapping, can be implemented by setting and maintaining URLs that identify the instances 108a-108n that can provide a given service 106a-106n, where such an association is maintained by the connection pool manager 114. The database publishes many services. The connection pools 116a-116n can use any service that is identified, such as by the URL or a connect string.

Notification Service

In general, a daemon is a process that runs in the background and that performs a specified operation at predefined times or in response to certain events. In general, an event is an action or occurrence whose posting is detected by a process. Notification service daemon 118 is a process that receives alert and advisory information from server 104, such as from background manageability monitors that handle automatic management functions of instances 108a-108n. The server 104 posts service level performance events automatically and periodically, for subscribers to such events, such as runtime connection load balancing clients 102a-102n. In one embodiment, service level performance events are posted periodically based on the service request rate.

Notification service daemon 118 has a publisher-subscriber relationship with event handler 120 through which service performance information that is received by daemon 118 from server 104 is transmitted as work distribution advisory events to event handler 120. In general, an event handler is a function or method containing program statements that are executed in response to an event. In response to receiving event information from daemon 118, event handler 120 at least passes along the event type and attributes, which are described herein. A single event handler 120 is depicted in FIG. 1 as serving all subscribers. However, different event handlers may be associated with different subscribers. The manner in which handling of advisory events is implemented by various subscribers to such events is unimportant, and may vary from implementation to implementation.

For a non-limiting example, notification service daemon 118 may use the Oracle Notification System (ONS) API, which is a messaging mechanism that allows application components based on the Java 2 Platform, Enterprise Edition (J2EE) to create, send, receive, and read messages.

Load Balancing in Clustered Computing Systems

In an embodiment, the connection pool manager performs (1) connection load balancing (e.g., distribution of connections) and (2) runtime connection load balancing (e.g., distribution of work), based on service level performance metrics associated with server instances that provide a service that performs work on a node of a clustered computing system. For example, with reference to FIG. 1, work requests coming from clients 102a-102n may be distributed by connection pool manager 114, via connections, among nodes 110a-110n that host instances 108a-108n that offer services 106a-106n that perform requested work. The distribution of the requested work is based on service level performance metrics that are associated with the active instances that are providing the particular service(s) that perform the requested work.

Service Measures

A performance metric is data that indicates the quality of performance realized by services, for one or more resources. A performance metric of a particular type that can be used to gauge a characteristic or condition that indicates a service level of performance is referred to herein as a service measure. Service measures include, for example, completed work per second, elapsed time for completed calls, resource consumption and resource demand, wait events, and the like. Service measures are automatically maintained, for every service.

Approaches to generating performance metrics, including service-based performance metrics on which service measures are based, which may be used for load balancing across a database cluster, are described in U.S. patent application Ser. No. 10/917,715 filed on Aug. 12, 2004, entitled "Managing Workload By Service" and U.S. patent application Ser. No. 11/168,967 filed on Jun. 27, 2005, entitled "Runtime Load Balancing Of Work Across A Clustered Computing System Using Current Service Performance Levels".

For example, a background process may generate performance metrics from performance statistics that are generated for each session and service hosted on a database instance. Like performance metrics, performance statistics can indicate a quality of performance. However, performance statistics, in general, include more detailed information about specific uses of specific resources. Performance statistics include, for example, how much time CPU time was used by a session, the throughput of a call, the number of calls a session made, the response time required to complete the calls for a session, how much CPU processing time was used to parse queries for the session, how much CPU processing time was used to execute queries, how many logical and physical reads were performed for the session, and wait times for input and output operations to various resources, such as wait times to read or write to a particular set of data blocks. Performance statistics generated for a session are aggregated by services and service subcategories (e.g. module, action) associated with the session.

Connection Load Balancing-Generally

A good implementation of an application that connects to a clustered computing system connects once to the system and stays connected. Since connections are relatively static, a process for balancing connections across a service that is offered by multiple server instances should not depend on metrics that vary widely during the lifetime of the connection.

Service Performance Metrics for Use in Connection Load Balancing

Therefore, in one embodiment, metrics regarding instances providing a particular service are available for use when distributing the assignment, or allocation, of connections from a given connection pool among instances providing the particular service: (1) session count, per instance; (2) run queue length of the node hosting the instance; (3) service level quality weighted by available capacity; and (4) weighted session count, per service, which are described in U.S. patent application Ser. No. 10/917,715. Once connections are allocated to a particular instance, the connections are ready to establish sessions with server instances in the computing system and to accept work requests for servicing. Further, in one embodiment, such work requests are routed to server instances via the connections, based on runtime load balancing performance advisories (e.g., work distribution percentages), such as those described in U.S. patent application Ser. No. 11/168,967 filed on Jun. 27, 2005, entitled "Runtime Load Balancing Of Work Across A Clustered Computing System Using Current Service Performance Levels".

For services that are uniformly distributed across a clustered computing system, and for nodes having similar processing capacities, the session count per instance is useful in evenly distributing connections across the system. For services that use a subset of the instances of a clustered computing system, and for nodes having different processing capacities, service quality weighted by available capacity is useful for distributing connections across the system by placing more potential sessions on the nodes that have less current processing load, at the time of connection creation.

For all services, including those having different priorities and using all or a subset of instances, and for nodes having any processing capacity, the goodness of the service is a ranking of the relative quality of service that the service is experiencing at an instance. In this embodiment, a performance grade associated with a particular service is, generally, a normalized ranking that compares the service response time and/or throughput of a service on an instance. Furthermore, the performance grades may also consider instance states, such as a state in which access to an instance is restricted. Examples of goodness rankings are "excellent," "average," "violating," and "restricted."

For all services, including those having different priorities and using all or a subset of instances, and for nodes having any processing capacity, the weighted session count by service of the service is a ranking of the power of the node to serve that service. The weighting compares the session count for the service to the node power. It also considers states such as a state in which access to an instance is restricted.

Ideally, connections are created infrequently and stay in a connection pool for a relatively long duration. Therefore, the run queue length and the goodness value of a service when the connection is created at, for example, 9:00 A.M., has little to no relevance to how good this connection is at 5:00 P.M. The run queue length and goodness metrics are more beneficial when computed frequently, for example, as close to use-time as reasonably possible, and/or when used in combination with other methods that gravitate the work requests to the best instances.

A session lifetime by service metric allows a determination of whether to consider static metrics or dynamic metrics for connection load balancing. The weighted sessions by service metric is useful in creating connections across a clustered computing system, that are long-lived. This is typical for connection pools and SQL*Forms sessions. The weighted sessions by service metric is insensitive to time and minimizes the need to relocate sessions as the profile of the system changes.

Runtime Connection Load Balancing

Runtime connection load balancing techniques are used when selecting connections from a connection pool to execute work requests. For connection pools that allocate connections to services offered by one instance only, the first available connection in the pool is adequate for use in routing and servicing a work request. However, when connection pools allocate connections to services that span multiple instances, using a policy such as service metrics distributes the work requests across instances that are serving the service well, and avoids sending work to slow, hung, failed and restricted instances.

For example, the service time, service throughput, and resource consumption are available for each service at each instance. Just as this data may be used by the connection pool manager to allocate connections across a service, the connection pool manager may use these data when selecting a connection from the pool to best serve a work request.

Connection load balancing is used only when connections are created. Since connections should be created infrequently, connection load balancing benefits from use of metrics that do not vary over time. Conversely, runtime connection load balancing is used whenever a work request (e.g., request for execution of a database statement) is made to a connection pool for a connection. This is a very frequent activity. Hence, the metric(s) used for runtime connection load balancing should be sensitive to the current performance of services across the system. The shorter the duration of the work request, the more sensitive the metric should be. Therefore, the elapsed time for completed calls (related to service time) and completed work (related to service throughput), in conjunction with the available capacity of a node (i.e., current node profile) and the resources required by a service (i.e., demand), are very good metrics for runtime connection load balancing purposes.

Service Events

In one embodiment, each connection pool manager 116a-116n (FIG. 1) subscribes to performance grade advisory events, where the event payload contains a service performance grade for each instance offering the service. Each event is relative to a particular service. In an embodiment, the posting process acquires these data once for all active services, and then posts an event per service.

As discussed, notification service daemon 118 has a publisher/subscriber relationship with event handler 120, through which certain event information that is received by daemon 118 from database server 104 is transmitted to event handler 120. In response to receiving event information from daemon 118, event handler 120 invokes a method of connection pool manager 114, passing along the event type and property, which are described hereafter.

In one embodiment, a message format that is used for communicating service performance information in an event payload, comprises name/value pairs. Specifically, a service event may comprise the following:

Event Type=performance grades (e.g., "Database/Service/Grades/$service_name");
   Version=version number of the publication protocol;
   Database name=unique name identifying database;
   Grades tuple (repeating for plurality of instances offering service)=instance name, flag (i.e., GOOD, VIOLATING, NODATA, UNKNOWN), grade; and
   Timestamp=time event was calculated at the server.

Runtime Connection Load Balancing Based on Performance Grade

In an embodiment, runtime balancing of system load (e.g., work being performed by the system) is based on service performance grade advisories, e.g., using the grades tuple (instance name, flag, grade) as the basis for making decisions. As discussed, these data are published to remote listeners that subscribe to the data publication. By providing this data to a connection pool manager client, better overall service is obtained by proactively routing work to the instances that best serve the work, rather than relocating sessions later in a reactive manner.

According to one embodiment, a method for runtime connection load balancing using service performance comprises (1) connection load balancing, i.e., allocating connections in a connection pool (which is associated with a particular service) to relatively well-performing instances ("gravitating") based, for example, on service goodness value and possibly a service delta value; and (2) runtime connection load balancing, i.e., in response to receiving work requests, routing the work requests to the currently well-performing instances based, for example, on service goodness percentages.

Server Functionality

In one embodiment, every few seconds every instance updates the moving average of its local service metrics and posts this to a master instance. The aggregated data and percentages are calculated internally at the master, and then posted to the event system, as described in U.S. patent application Ser. No. 11/168,967 filed on Jun. 27, 2005, entitled "Runtime Load Balancing Of Work Across A Clustered Computing System Using Current Service Performance Levels".

Connection Pool Functionality

I. Connection Retrieval

The server posts performance grade tuples to the connection pool periodically, where the tuples provided are for each database service. The grade tuples include grades, which represent percentage of work to send to that instance, as well as a flag indicating the state of the instance. The sum of the percentages for each service is 100%.

The Connection Pool retrieves connections to instances based on the four possible flag values: GOOD, UNKNOWN, VIOLATING, NO_DATA. The first three flag values indicate that the instance percentages are valid and should be honored. The Connection Pool will retrieve connections to these instances. The NO_DATA flag indicates that the instance is not responding, in which case the Connection Pool will not retrieve any connections to an invalid instance.

In one embodiment, the Connection Pool satisfies a connection request to a given service by performing the following steps:

(1) Compute the sum of the percentages for the valid instances providing the service.

(2) Compute a pseudo random number greater than or equal to zero and less than the sum computed in step 1.

(3) Arrange the instances in some arbitrary order. Set the value TOTAL to zero. Consider the first instance.

(4) Add the percentage for the instance to TOTAL.

(5) If the pseudo random number is less than TOTAL, select the instance. Otherwise, consider the next instance and go to step 4.

(6) Retrieve a connection from the selected instance from the connection pool.

II. Connection Gravitation

A purpose of a connection pool, such as connection pools 116a-116n, is to have connections that are ready to use when connection requests are received. Consistently and periodically gravitating the connections from a given connection pool toward the well-performing ("healthy") instances helps to ensure that all connections are good to use when work requests are received. A connection pool manager, such as connection pool manager 114, typically releases connections that are idle in the connection pool for a specified expiration period, and some connection pool managers release connections in the connection pool because the connections have been in the pool for some time.

Generally, the process of gravitating connections toward the healthy instances may comprise any of (1) determining which connections to retire, (2) determining which connections to keep and, (3) when connections are added, ensuring that these new connections are allocated to healthy instances. Previously, the connections were retired randomly and at arbitrary times, i.e., there was no knowledge as to which connections were good connections relative to their ability to facilitate performance of work, and no knowledge of when retiring connections was needed.

Which instance is a connection is connected to is determined by the metrics current at the moment when the connection is created. As a result, the number of connections to each instance approximates the percentages in the metrics. Over time the metrics change, but the connections to the instance to which it is connected typically would not change. As a result, the number of connections to each instance would no longer approximate the percentages. This results in too many connections with low percentages and too few connections to instances with high percentages. Hence, connection gravitation gradually rectifies this problem by selectively retiring connections to an instance.

Connections are selected for retirement based on the following two ratios:

Attempted Connection Ratio=(Request count per instance)/(Total request count);

Connection Ratio=(Connection count per instance)/ (Total connections in the pool).

Retirement criteria for an instance is met when there are far more connections available to an instance than the metrics percentage indicates for that instance. If for a given instance the Connection Ratio is much greater than the Attempted Connection Ratio, then instances to that connection can be retired. In one embodiment, once an instance is chosen for retiring connections, about 25% of available connections are actually retired. This allows for a gradual gravitation over time.

Method for Routing Work Requests to a Clustered Computing System

Figure 2:
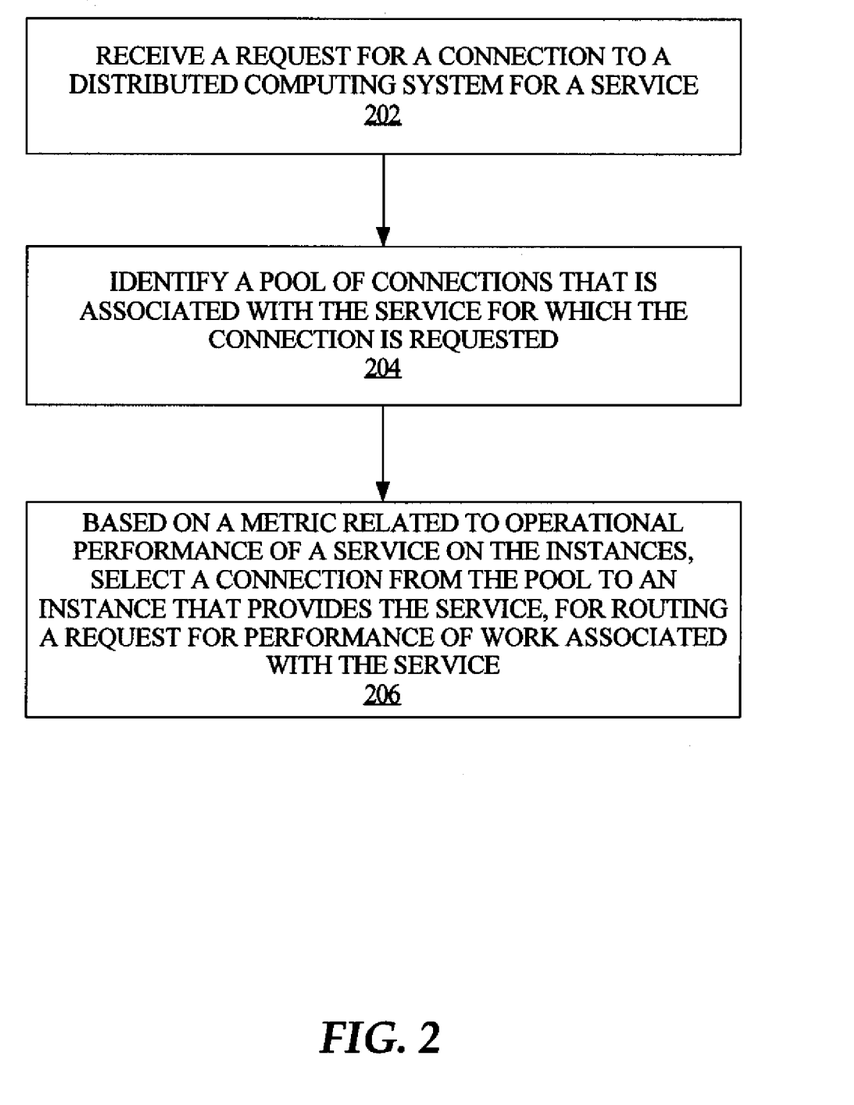
FIG. 2 is a flow diagram that illustrates a method for routing work requests to a clustered computing system, according to an embodiment.

FIG. 2 is a flow diagram that illustrates a method for routing work requests to a clustered computing system, according to an embodiment of the invention. The method may be performed by any sequence(s) of one or more instructions (e.g., a software module) which, when executed, cause one or more processors to perform steps illustrated in the blocks of FIG. 2. For example, the method may be performed by connection pool manager 114 in the context of a database server 104. However, the techniques embodied in the method of FIG. 2 may be performed by any implementation that manages and/or distributes work across a clustered computing system by providing connections to a component or module that processes work requests, for routing of such requests.

At block 202, a request is received for a connection to the clustered computing system for performance of work. For example, connection pool manager 114 receives a request from a client 102a, for a connection to database server 104. The request may be in the form of an explicit request for a connection, a request for work, or any other type of request that would require a session with, and therefore a connection to, the clustered computing system.

At block 204, a pool of connections is identified that is associated with a service that performs the work for which the connection is requested. For example, connection pool manager 114 determines that service 106b performs the requested work and identifies that connection pool 116b serves connections to the service 106b. The service that performs the work may be identified in a number of ways, such as based on the nature of the request or based on information contained in the request that specifies the service. A mapping between services and associated connection pools may be accessed to identify the specific pool that is associated with the identified service.

At block 206, a connection to an instance that provides the requested service is selected from the identified connection pool, based on metrics related to the operational performance of the service on the identified instances. The selected connection is used for routing a request to the particular node/instance/service for performance of the work. In one embodiment, the connection is selected based on the service grade, described above. For example, the selection is based on the substantially current service response time or throughput for each of the instances providing the service, characterized by the grades tuple (i.e., instance name, flag, grade (i.e., work distribution percentage)), or based on a subset thereof.

Implementation Mechanisms

The approach for runtime connection load balancing of work across a clustered computing system, as described herein, may be implemented in a variety of ways and the invention is not limited to any particular implementation. The approach may be integrated into a system or a device, or may be implemented as a stand-alone mechanism. Furthermore, the approach may be implemented in computer software, hardware, or a combination thereof.

Hardware Overview

Figure 3:
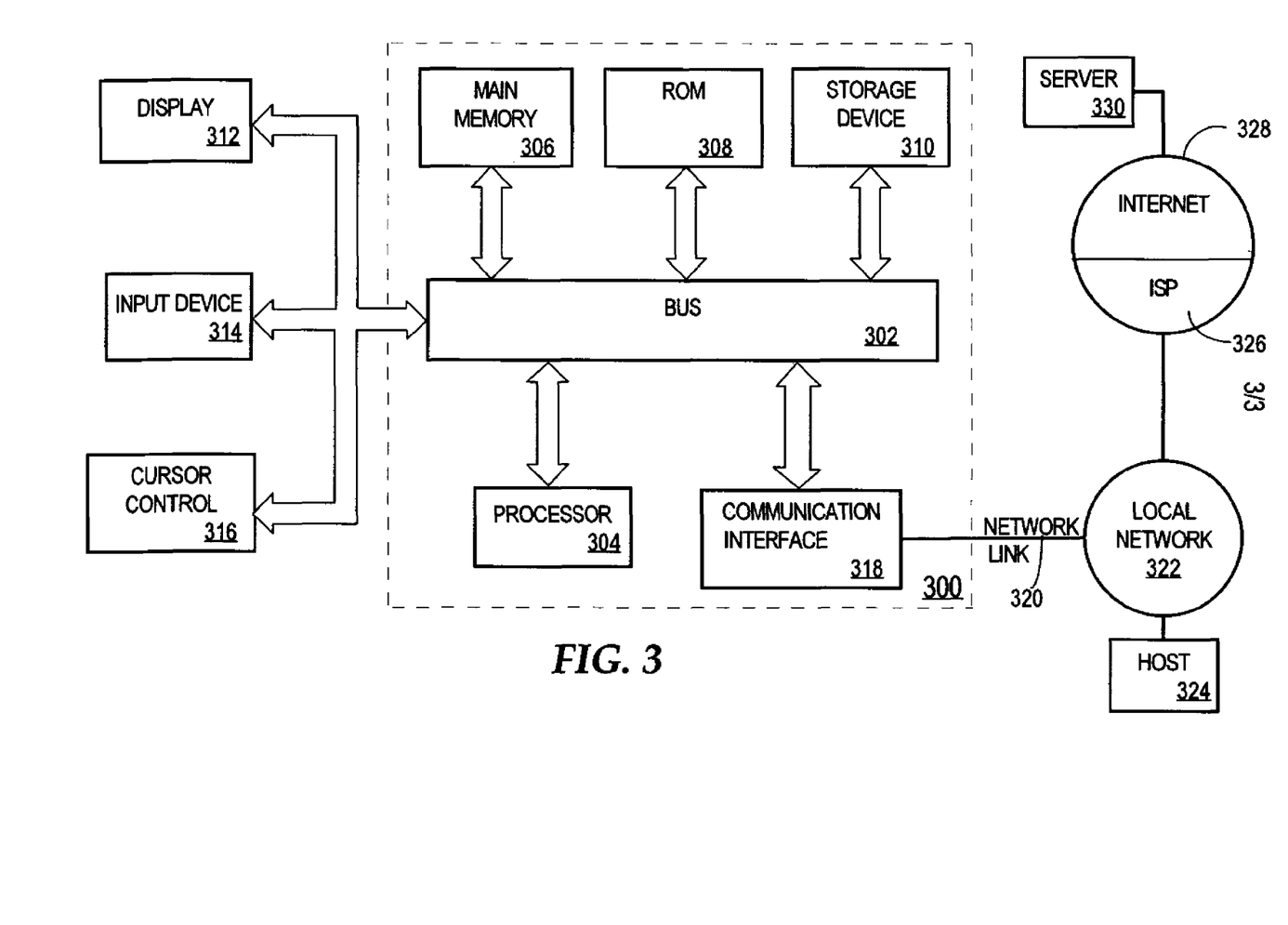
FIG. 3 is a block diagram that depicts a computer system upon which an embodiment of the invention may be implemented.

FIG. 3 is a block diagram that depicts a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, embodiments of the invention are described herein in the context of a database server; however, the described techniques are applicable to any distributed computing system over which system connections are allocated or assigned, such as with a system configured as a computing cluster or a computing grid. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A computer-implemented method for managing connections to a computing system that comprises a plurality of computing nodes that host a plurality of server instances that provide a service, the method comprising:

periodically gravitating connections between server instances of said plurality of server instances to other server instances of said plurality of server instances, wherein said periodically gravitating is based on performance information of said plurality of server instances;

wherein said connections are associated with a connection pool and said connection pool includes at least two connections to a server instance of said plurality of server instances that provides said service; and wherein said periodically gravitating includes allocating new connections associated with said connection pool to said other server instances;

wherein the method is performed by one or more computing devices.

2. The method of claim 1, further comprising:

in response to a request for a connection to said computing system for requesting said service, selecting a particular connection that is associated with said service, to route a request for performance of work associated with said service;

wherein said selecting is based on substantially current performance information for said server instances that provide said service that is associated with said selected connection.

3. A non-transitory machine-readable storage medium storing one or more sequences of instructions which, when executed by one or more processors, causes the one or more processors to perform:

periodically gravitating connections between server instances of a plurality of server instances that provide a service to other server instances of said plurality of server instances, wherein said periodically gravitating is based on performance information of said plurality of server instances;

wherein said connections are associated with a connection pool and said connection pool includes at least two connections to a server instance of said plurality of server instances that provides said service; and wherein said periodically gravitating includes allocating new connections associated with said connection pool to said other server instances.

4. The non-transitory machine-readable storage medium of claim 3, said instructions further comprising instructions which, when executed by one or more processors, causes the one or more processors to perform:

in response to a request for a connection to said computing system for requesting said service, selecting a particular connection that is associated with said service, to route a request for performance of work associated with said service;

wherein said selecting is based on substantially current performance information for said server instances that provide said service that is associated with said selected connection.

* * * * *

UNITED STATES PATENT AND TRADEMARK OFFICE
CERTIFICATE OF CORRECTION

| | | |
|---|---|---|
| PATENT NO. | : 8,626,890 B2 | Page 1 of 1 |
| APPLICATION NO. | : 12/938545 | |
| DATED | : January 7, 2014 | |
| INVENTOR(S) | : Colrain et al. | |

It is certified that error appears in the above-identified patent and that said Letters Patent is hereby corrected as shown below:

On title page, column 1, under Inventors, line 3, delete "Mountian" and insert -- Mountain --, therefor.

On title page 2, column 2, under Other Publications, line 13, delete "E-Commercce" and insert -- E-Commerce --, therefor.

Signed and Sealed this
Thirtieth Day of June, 2015

Michelle K. Lee
*Director of the United States Patent and Trademark Office*